(12) United States Patent
Tenneti

(10) Patent No.: US 8,776,110 B1
(45) Date of Patent: Jul. 8, 2014

(54) VIDEO SLATE DEVICE

(75) Inventor: Surya Prakash Tenneti, Belle Mead, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 313 days.

(21) Appl. No.: 13/087,110

(22) Filed: Apr. 14, 2011

(51) Int. Cl.
*H04N 7/10* (2006.01)

(52) U.S. Cl.
USPC .......................................................... 725/32

(58) Field of Classification Search
USPC .......................................................... 725/32
See application file for complete search history.

(56) References Cited

U.S. PATENT DOCUMENTS

| | | | |
|---|---|---|---|
| 2005/0015477 A1* | 1/2005 | Chen | 709/223 |
| 2012/0242778 A1* | 9/2012 | Ayers | 348/14.09 |
| 2012/0311564 A1* | 12/2012 | Khalid | 718/1 |

* cited by examiner

*Primary Examiner* — Pankaj Kumar
*Assistant Examiner* — Charles N Hicks

(57) ABSTRACT

A terminal device includes a reproducing circuit for audio and video, an input device, a minimum storage medium storing a video slate program, and a network interface. The terminal device receives the audio and video through the network and provides appropriate outputs. The terminal device operates an application program through the network and displays operations of the application program on the display. The terminal device lacks a hard disk drive, large memories, internet browser software and a typical operating system. The video slate program, when executed, causes the terminal device to display one or more content frames on the display. The content frames include an OS frame that shows an image of operations of the application program, a phone frame that shows an image of remotely executing phone operation, a television frame that shows the video, and an advertisement frame that shows an image containing an advertisement.

22 Claims, 5 Drawing Sheets

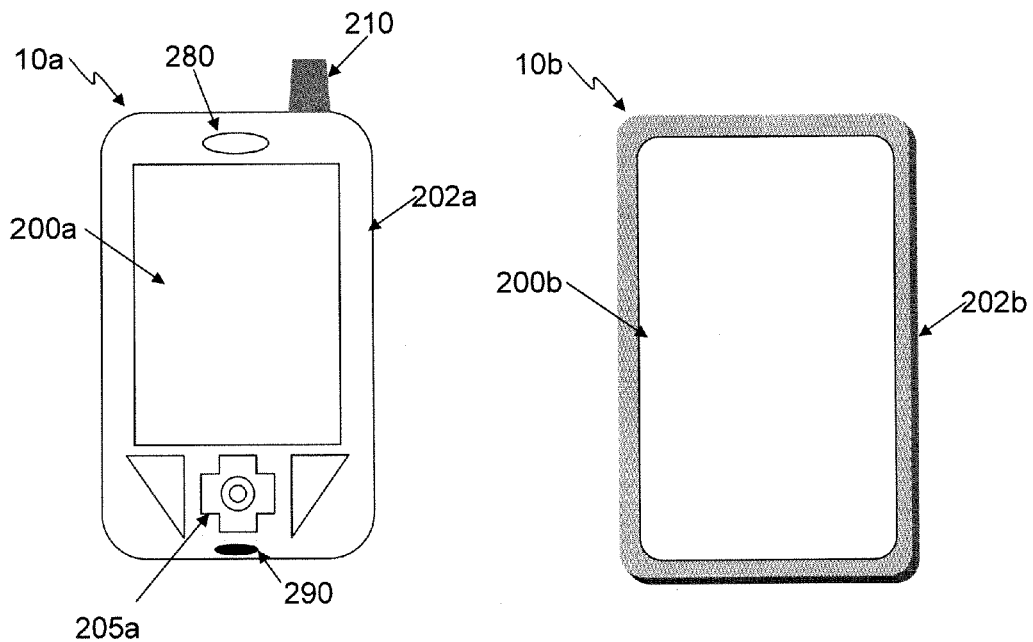
FIG. 1A
FIG. 1B
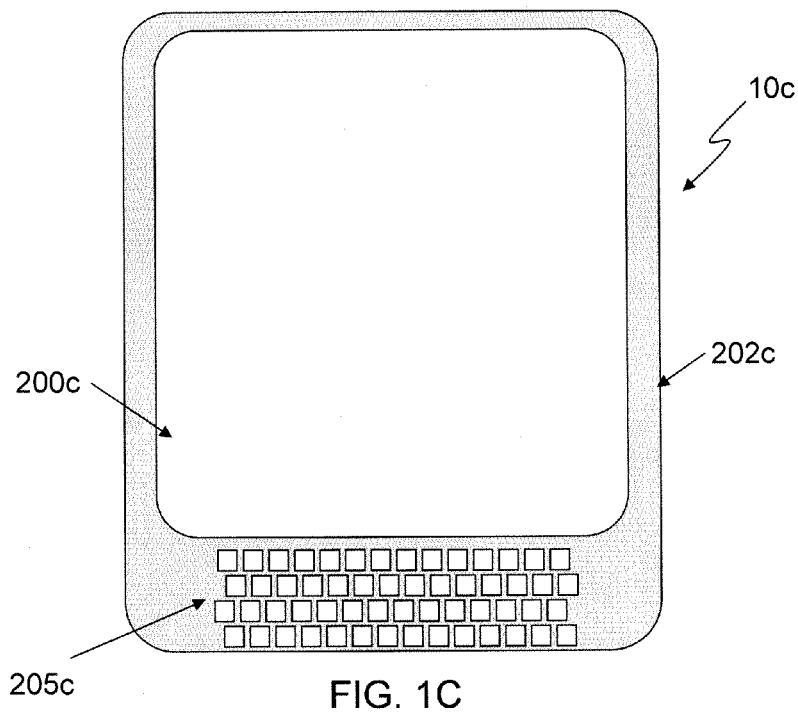
FIG. 1C

VIDEO SLATE DEVICE

TECHNICAL FIELD

The present disclosure relates to a video slate device for reproducing audio and video streams. More specifically, while the device is capable of reproducing audio and video streams, the device does not have application programs, large capacity non-volatile rewritable memories and typical operating systems.

BACKGROUND

Mobile devices such as smart phones (e.g., Android phones or i-Phone®), i-Pad® or laptop computers, have become very popular devices for reproducing audio and video contents. Although the bandwidth of networks to communicate to and from such mobile devices is increasing, in current mobile devices, the device itself performs many tasks on the device side through execution of application programs running on an operating system. Examples of mobile device operating systems include versions of Windows®, Android, MAC OS, iOS, Linux, a RIM OS, QNX, GENIVI or VxWorks. The application programs may include, for example, a web-browsing program, an AV reproducing program, a social networking (SNS) system program, utility programs or games. Accordingly, it is necessary for the current mobile devices to have a high performance CPU and a large capacity storage device such as a HDD (hard disk drive) or a flash memory having more than several giga-byte capacities, which inevitably makes the mobile devices complex, power consuming, heavy and expensive.

On the other hand, a so-called "thin-client" system has been developed. In the thin-client system, the servers process most of the tasks and the terminals have minimum functions. In some applications, the terminal may not have a HDD or a high capacity flash memory to locally store data for security reasons. Such terminals of the thin-client system, however, still need an operating system. Thus, it is necessary to update the operating system, for example, periodically. Further, in the thin-client system, since one family of operating systems (e.g., the Windows® family) is utilized, only applications that can run on such an OS family are available through the terminal device.

However, as the bandwidth of the networks increases, communication latency becomes shorter, and cost for the use of the network becomes lower, the function or role of the mobile devices may change. For example, mobile devices may become mere input/output terminals, while all tasks are processed at servers accessed over the network. The mobile devices may be utilized to input commands from the user and to output (e.g., display) results responsive to the input. This will become more feasible in cloud computing systems. Accordingly, there is a need for a terminal device which is simple, light weight and low cost.

SUMMARY

The teachings herein address one or more needs for a terminal device which is capable of reproducing audio and video streams but does not have application programs, large capacity non-volatile rewritable memories or any of the typical operating systems.

In an example, a terminal device (e.g., a video slate device) includes an input device for receiving a user input, a storage medium storing a video slate program, a network interface for communication via a network and a reproducing circuit for reproducing, respectively using an audio output and a display, audio and video streams received through the network interface. The terminal device is configured to operate a non-native application program through the network and display operations of the non-native application program on the display. The terminal device lacks a hard disk drive, any operating system for executing the non-native application program and internet browser software. The terminal device may include, in terms of an operating system, only a minimum operating system utilized for executing the video slate program, and does not include any other operating system for the non-native application program.

The terminal device lacks any version of Windows, Android, a MAC OS, iOS, Linux, a RIM OS, QNX, GENIVI or VxWorks on which the non-native application program is able to be executed. Thus, the non-native application program cannot be executed on the terminal device.

The video slate program is a program which, when executed, causes the terminal device to provide a signal so that the display displays one or more content frames, e.g., an image received from a server as a result of the operation of the non-native application program. The video slate program is a minimum program to receive images from the server and to display a content frames on the display, and is different from typical application programs.

In the above terminal device, the video slate program, when executed, may further cause the terminal device to provide a signal so that the display displays one of content frames of an OS frame, a phone frame, a television frame and an advertisement frame. The OS frame may show an image of operations of the application program executed on the server, regardless of operating systems on which the application program runs. The phone frame may show an image of a remotely executing phone operation including IMS. The television frame may show a television program view. The advertisement frame may show an image containing an advertisement.

The aforementioned terminal device may include the display and the audio output device. The display and the input device may be integrated as a touch panel display in the terminal device.

In the above terminal device, the network interface may be configured for communication through the Internet.

In the above terminal device, the terminal device does not include a non-volatile rewritable memory such as a flash memory. If a flash memory is included, the capacity of the flash memory is at most 1 GB. In some case, the capacity of the included flash memory is at most, for example, 512 MB, or at most, for example, 4 GB.

The minimum operating system of the terminal device may be based on a reduced Linux operating system.

In the above terminal device, the reproducing circuit may include a processor and software stored in a storage device, or a video processor.

In the above terminal device, the wireless network may be a 4G wireless implementation of the network (herein after "the 4G network"). The network interface is configured to receive at least one of a unicast service and a broadcast service available on the 4G network.

The terminal device may be included in a set top box. In such a case, the terminal device is configured to output image signals for displaying on an external display. Further, the terminal device may be mounted on a car as a telematics headend.

Another example of the present disclosure is a video slate system including a server system storing application programs and operating systems on which application programs run, and a terminal device (e.g., a video slate device) connected through a network to the server system.

The server system may be configured to receive information for selecting an operating system among the operating systems from the terminal device via the network, receive information for selecting an application program which runs on the selected operating system from the terminal device via the network, execute the selected application program on the selected operating system by the server, and send an operation image of an operation of the selected application program via the network to the terminal device.

The terminal device may be configured to send the information for selecting an operating system, send the information for selecting an application program, operate the selected application program through the network by user inputs via an input device, and display the operation image of the selected application program on a display. Here, the selected application program is executed exclusively on the server system without executing any of the selected application program and the selected operating system on the terminal device.

The terminal device lacks a hard disk drive, an operating system for executing the non-native application program and internet browser software. The terminal device may include, in terms of an operating system, only a minimum operating system utilized for executing the video slate program, and does not include any other operating system for the non-native application program. The video slate program is a program which, when executed, causes the terminal device to provide a signal so that the display displays one or more content frames. The content frames may show an image received from the server.

The terminal device lacks any version of Windows, Android, a MAC OS, iOS, Linux, a RIM OS, QNX, GENIVI or VxWorks on which the non-native application program is able to be executed. Thus, the non-native application program cannot be executed on the terminal device.

In the above system, the server system may be further configured to receive a request for audio and video data from the terminal device, and send audio and video streams of the requested audio and video data upon receiving the request. The terminal device may comprise a reproducing circuit for reproducing audio and video streams as outputs through a display and an audio output device. The terminal device may be further configured to send the request received from a user through the input device, receive the audio and video streams through the network from the server system, and display a video on the display and outputs an audio from the audio output device by reproducing the received audio and video stream by the reproducing circuit.

The terminal device in the system may include a display and a audio output device. In the system, the network is the 4G wireless network. The terminal device includes a network interface for communication via the 4G wireless network, and the network interface is configured to receive at least one of a unicast service and a broadcast service available on the 4G network.

In the system, the terminal device does not include a non-volatile memory, e.g., a flash memory. If a flash memory is included, the capacity of the flash memory is at most 1 GB. In some case, the capacity of the included flash memory is at most, for example, 512 MB, or at most, for example, 4 GB.

In the system, the server system may be configured to detect a specification of the display including a size of the display, and to adjust said one or more content frames to be displayed on the display.

In the system, the terminal device may include a first terminal device and a second terminal device. In response to the input by the user to the first terminal, the second terminal displays operation results according to the input.

Yet another example of the present disclosure is a method including the following operations. A server receives information for selecting an operating system among a number of operating systems from a terminal device (i.e., a video slate device) via a network. The server receives information for selecting an application program which runs on the selected operating system from the terminal device via the network. The selected application program is executed exclusively on the selected operating system by the server without executing any of the selected application program and the selected operating system on the terminal device. The server sends a display image of the executed application program via the network to the terminal device. The server may further send video data in a stream to the terminal device upon receiving a request for the video data from the terminal device.

In the method, the terminal device lacks a hard disk drive, an operating system for executing the non-native application program and internet browser software. The terminal device may include, in terms of an operating system, only a minimum operating system utilized for executing the video slate program, and does not include any other operating system for the non-native application program.

The video slate program is a program which, when executed, causes the terminal device to provide a signal so that the display displays one or more content frames. The content frames may show an image received from the server.

The present device, system and method, together with further objects and advantages, can be better understood by reference to the following detailed description and the accompanying drawings.

BRIEF DESCRIPTION OF THE DRAWINGS

FIGS. 1A-1C show front views of exemplary video slate devices.

DETAILED DESCRIPTION

Figure 2:
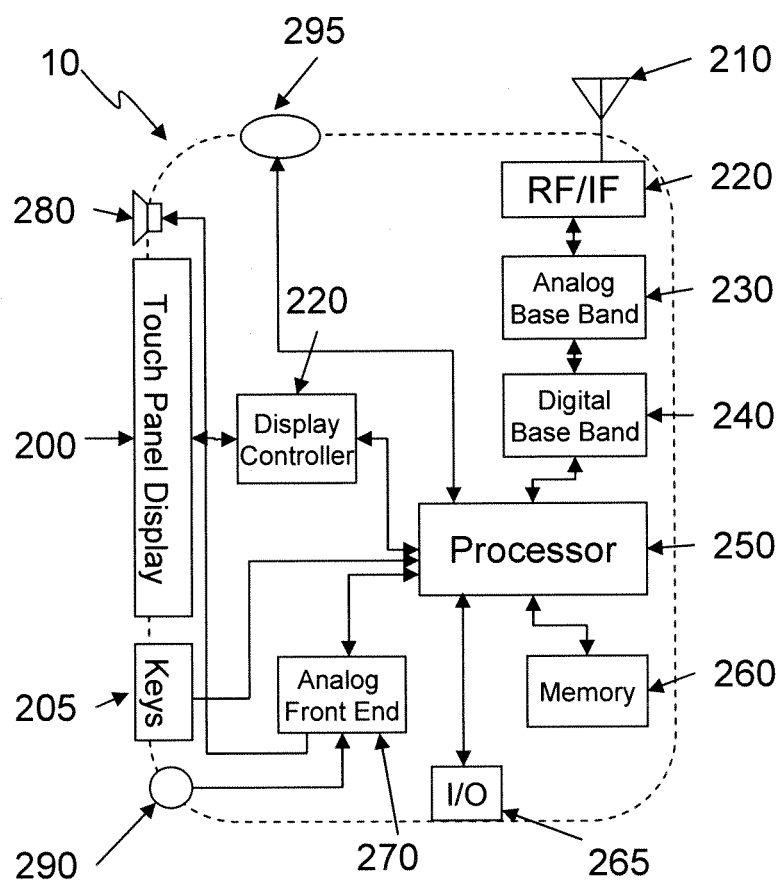
FIG. 2 is an exemplary block diagram of components of a video slate device.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various devices, systems and methods disclosed herein relate to reproducing audio and video information through a terminal device of minimalist application processing and storage capabilities, i.e., a video slate device, by utilizing an operating system and executing a non-native application program operating on a server instead. In some case, the non-native application programs may be executed on a PC or another mobile terminal connected via a network. Reference now is made in detail to the examples illustrated in the accompanying drawings and discussed below.

FIGS. 1A-1C illustrate the front view of exemplary video slate devices. In the examples, the video slate device 10 (i.e., 10a, 10b or 10c) is a mobile terminal device. FIG. 1A shows an example of a cellular phone type device 10a, FIG. 1B shows an example of a fully touch-sensitive cellular phone ("smart phone") type device 10b, and FIG. 1C shows an example of an electronic book reader or tablet type device 10c. Although those skilled in the art will appreciate that the video slate technique may be implemented with any other type of terminal devices, the exemplary video slate device 10a includes a main body 202a, input keys 205a, and a touch panel display 200a. The display 200a may not necessarily be a touch panel type display. Input keys 205a and a conventional display may be combined. The video slate device 10a also includes antenna 210, a speaker 280, and a microphone 290. A camera may be included as an input device. In FIG. 1B, smart phone type device 10b may also include a main body 202b and a touch panel display 200b. In FIG. 1C, book reader or tablet type device 10c may also include a main body 202c, a touch panel display 200c and key board 205c. The configuration of the video slate device elements is not limited to the arrangements shown in FIGS. 1A to 1C. For example, the video slate device of the present disclosure may be mounted on a car as a telematics headend.

FIG. 2 shows an exemplary block diagram of elements of the video slate device 10 of FIG. 1A, FIG. 1B or FIG. 1C. The video slate device 10 includes an RF interface 220 connected to the antenna 210, an analog base band processor 230 and a digital base band processor 240 connected to a processor 250. A display controller or a driver 220 is connected to the touch panel display 200 (i.e., 200a, 200b or 200c) and the processor 250 for controlling the touch panel display 200. An analog front end processor 270 is connected to the processor 250 for controlling the speaker 280 and the microphone 290. The processor 250 is configured to control the display controller 220, RF circuits (220, 230 and 240), the analog front end processor 270, and an I/O circuit 265. All or a part of the video slate device circuitry may be so structured or configured by hardware logic to perform the intended functions.

The processor 250 also connects to memory 260 as a storage medium. The memory 260, for example, may include a RAM, a ROM or a flash memory. The memory stores a video slate program. The video slate program is executed by the processor 250 to perform predetermined functions.

However, this memory 260 is provided for the use of the processor 250, and does not store data of large volume, for example, video contents or application programs. Thus, even though the memory 260 is provided to the video slate device, a total amount of the capacity thereof is not more than, for example, 1 GB. More specifically, if a flash memory is provided as a non-volatile rewritable memory, the capacity thereof is not more than 1 GB. In some case, the capacity of the included flash memory is at most, for example, 512 MB, or at most, for example, 4 GB. In other words, the video slate device 10 does not include any non-volatile rewritable mass-storage device for storing contents or application programs. Of course, a HDD is not provided for the video slate device 10.

Further, the video slate device 10 lacks any version, which is presently available, of Windows, Android, a MAC OS, iOS, Linux, a RIM OS, QNX, GENIVI and VxWorks as operating systems. Thus, the non-native application program cannot be executed on the video slate device. Instead, the video slate device includes a minimum operating system, which in one embodiment may be based on a reduced Linux operating system for executing the video slate program. Reduced versions of the above typical operating systems, if they are available in the future, may be utilized.

Accordingly, the structure of the video slate device 10 will be simpler than that of the conventional mobile terminals, because the device includes only a minimum operating system and does not include mass storage devices.

The processor 250 works as a reproducing circuit for reproducing audio and video streams as outputs using a display and an audio output device, respectively. The processor 250 may be a specifically designed semiconductor device (e.g., ASIC), or a processor operating with software stored in a storage device. For example, the software for reproducing the audio and video streams may be embedded in the semiconductor device as a ROM. Instead, the reproducing circuit may be provided a separate device, such as a video processor.

Figure 3:
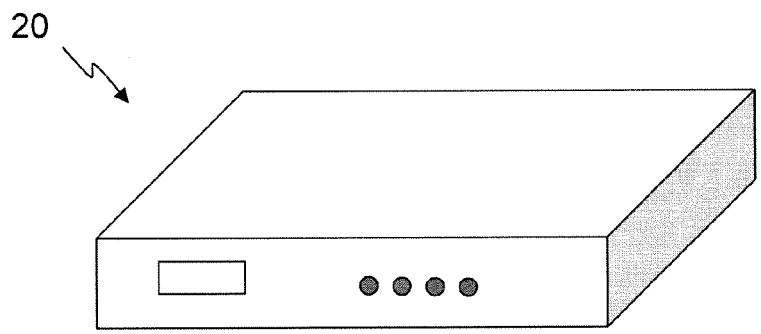
FIG. 3 shows a view of another exemplary video slate device.
Figure 4:
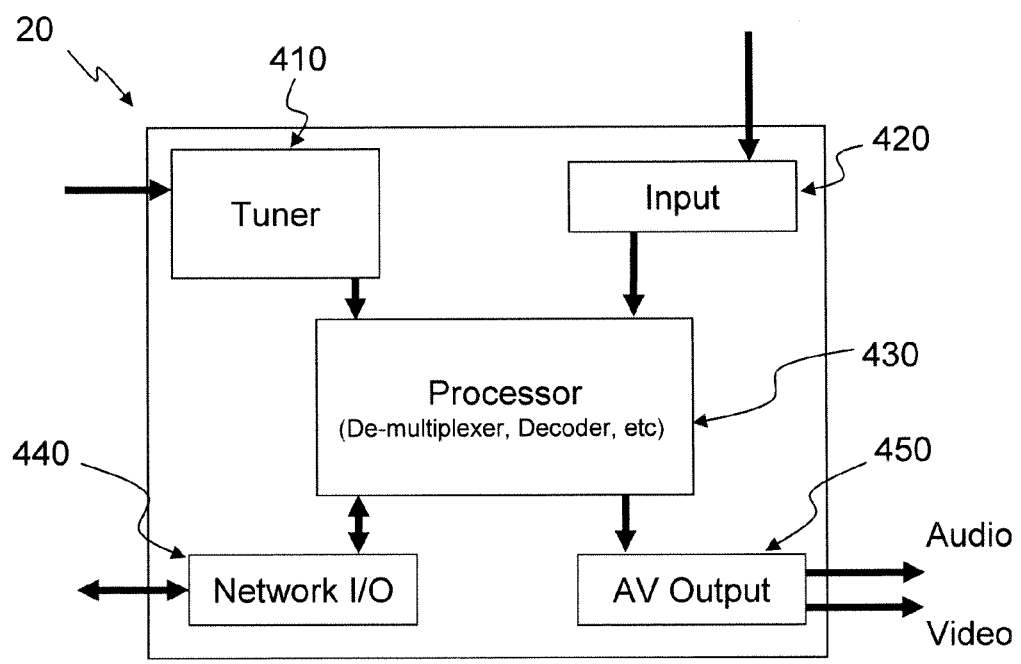
FIG. 4 is an exemplary block diagram of components of a video slate device like the device of FIG. 3

FIG. 3 shows a view of another exemplary video slate device. In this example, the video slate device 20 is a set top box. FIG. 4 shows an exemplary block diagram of elements of the video slate device 20 as illustrated in FIG. 3. The video slate device 20 includes a tuner 410, an input device 420, a processor 430, a network I/O circuit 440 and an AV output circuit 450. The tuner 410 receives AV contents from a cable TV system, a satellite TV system or a broadcasting TV system. If the contents are multiplexed and encoded, the processor 430 de-multiplexes and decodes the received contents. The decoding process may include a process according to MPEG (e.g., MPEG2). The decoded contents are transferred to the AV output circuit 450 and reproduced as audio and video contents. The audio output circuit and the video output circuit may be separately provided. The audio output is directed to a speaker and the video output is directed to an external display. The tuner 410 may not be included in the video slate device 20. In such a case, a TV program is selected at and provided from a server system.

The input device 420 is configured to receive user inputs, from a remote controller or via keys on the device 20. In response to such user inputs, the video slate device 20 provides information to the user. The video slate device 20 is also connectable to a network, e.g., the Internet through the network I/O circuit 440.

The processor 430 works as a reproducing circuit for reproducing audio and video streams as outputs through a display and an audio output device, respectively. The processor 430 may be a specifically designed semiconductor device (e.g., ASIC), or a processor operating with software stored in a storage device. The software for reproducing the audio and video streams may be embedded in the same semiconductor device as the processor. Instead, the reproducing circuit may be provided a separate device, such as a video processor.

The processor 430 connects to memory as a storage medium or includes the memory. The memory may include a RAM, a ROM or a flash memory. The memory stores a video slate program. The video slate program is executed by the processor 430 to perform predetermined functions. However, this memory is provided for the use of the processor 430, and does not store data of large volume, for example, video and/or audio contents or application programs. Again, even though the memory may be provided to the video slate device 20, a total amount of the capacity thereof is not more than, for example, 1 GB. For example, if a flash memory is provided as a non-volatile rewritable memory, the capacity thereof is at most 1 GB. In some case, the capacity of the included flash memory is at most, for example, 512 MB, or at most, for example, 4 GB. In some case, no flash memory is provided. In other words, the video slate device 20 does not include any non-volatile rewritable mass-storage device. Specifically, a HDD is not provided for the video slate device 20.

Further, the video slate device 20 lacks any version, which is presently available, of Windows, Android, a MAC OS, iOS, Linux, a RIM OS, QNX, GENIVI and VxWorks as operating systems. Thus, the non-native application program cannot be executed on the video slate device. Instead, the video slate device includes a minimum operating system, which in one embodiment may be based on a reduced Linux operating system for executing the video slate program.

Accordingly, the structure of the video slate device 20 will be simpler than that of the conventional set top boxes, because the device includes only a minimum operating system and does not include mass storage devices.

Figure 5:
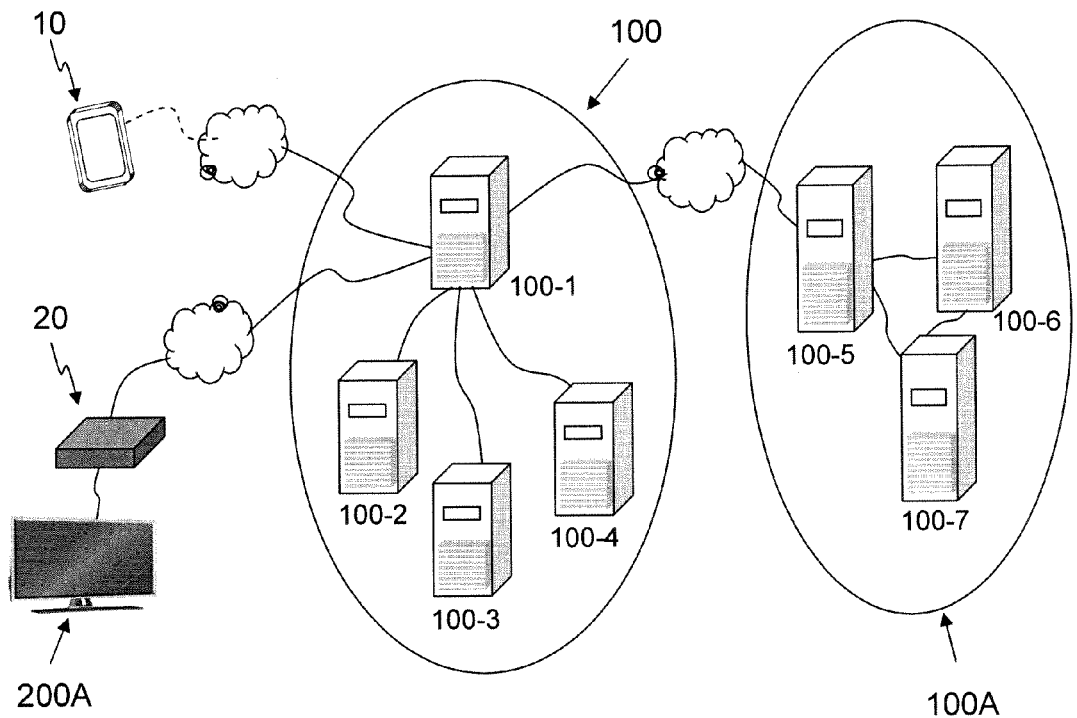
FIG. 5 shows an exemplary system diagram.

FIG. 5 shows an exemplary diagram of a server system connected with video slate devices. The video slate device 10 is connectable to a server system 100 through a wireless network and/or other networks. The wireless network may be a 4G wireless implementation of a network ("4G network"). In such a case, the video slate device 10 is provided with a network interface configured to receive a unicast service and/or a broadcast service available on the 4G network. The video slate device 20 is connectable to the server system 100 through a network including a cable network or the Internet.

Although the server system 100 may be one server computer, the example shows a system 100 having a number of server computers 100-1 to 100-4, in this case, for providing different types of contents. When the server system contains a number of server computers, each server computer may have its own function. In the example, the computer 100-2 is configured or programmed to provide advertisements to the video slate devices, the computer 100-3 is configured or programmed to provide audio and video programs to the video slate devices, or the computer 100-4 is configured or programmed to execute application programs and to provide results of execution to the vide slate devices. Another server computer, together with other devices, may function as a digital telephone switcher.

The server system 100 in one example further connects to another server system 100A, thereby constructing the server system for the video slate devices. The server system 100A includes a number of server computers 100-5, 100-6 and 100-7. The servers of the second system 100A may have different functions, or the servers of that system may have functions the same as or similar to the servers of the system 100 (the server as alternative or backup to the server system 100).

Figure 6:
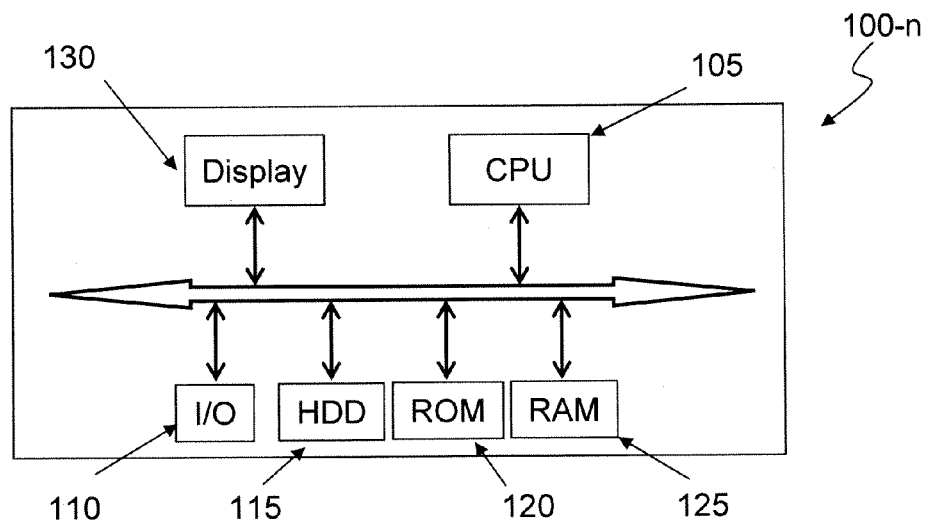
FIG. 6 is an exemplary block diagram of components of a server.

FIG. 6 shows an exemplary diagram of elements of each of the server computers 100-n (n=1, 2, . . . ). The exemplary server computer typically includes a CPU 105, an I/O circuit 110, a storage device such as an HDD 115, memories such as a ROM 120 and a RAM 125, and a display 130. The display 130 may not necessarily be provided to every server computer. These devices are communicably connected via a bus line. Such a server computers typically is a general purpose computer having a storage device storing programs. The programs, when executed by the CPU 105, cause the computer to perform the intended functions or operations.

When a user purchases a video slate device 10 or 20, the user is directed to connect, via a network, to the server system 100. The connection may be automatically executed upon being turn-on of the video slate device 10 or 20 for the first time by the user. When connecting to the server, the video slate device 10 or 20 may send information regarding the device itself. The information may include identification information of the device, model information, a phone number assigned to the user or the information that indicates the device is a video slate device. The user may be requested to input identification information of the user.

Upon acknowledging the connection or access from the video slate device 10 or 20, the server system 100 returns a request to the video slate device. The request, when displayed on the display, urges the user to select an operating system from a number of operating systems which the server 100 can execute. The operating system may include an operating system from: a Windows® family, an Android family, a MAC OS family, an iOS family, a Linux family, a RIM family, a QNX family, a GENIVI family or a VxWorks family. The user may select his or her familiar operating system. The selection of the operating system can be changed anytime later.

Once the user selects the desired operating system, such a selection is sent to the server system 100 via the network. The server system 100 records the operating system selection in the storage device in connection with the information received from the video slate device so that whenever the video slate device is re-connected to the server system 100, the server system 100 does not send the request for selecting an operating system.

Figure 7:
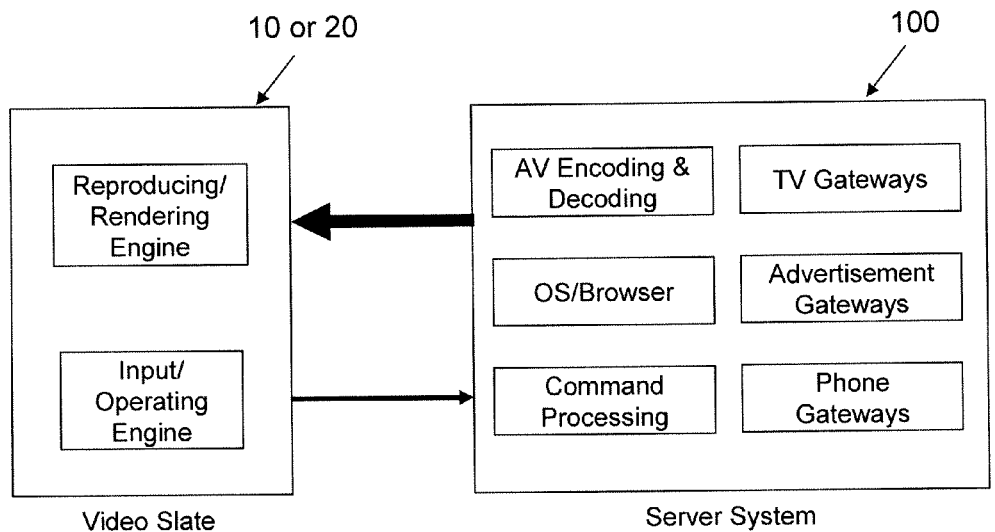
FIG. 7 shows interaction between a video slate device and a server.

When the operating system is set, the user has the ability to select a non-native application program (stored on a remote server to which the video slate device 10 is connected) from among available applications which are executable on the selected operating system. The user then can input commands to the application program through input keys 205 of the video slate device 10. The input commands are sent via the network to the server system 100, and the server system 100 executes the commands to the application program. Results of the executed commands are sent back to the video slate device and displayed on the display 200 (in case of a set-to-box type video slate device 20, on the external display). The execution results are sent to the video slate device as a display image (or video stream) and/or as an audio stream. It is noted that the application program is exclusively executed by the server system 100 and the video slate device 10 or 20 does not execute the application program but works as an input/output engine as shown in FIG. 7.

Typically, the video slate device 20 is utilized as an audio and visual output terminal. When the user wishes to watch a video program on the video slate device, the user accesses the server and the server provides selection among the video programs. When the user selects a video program, the video slate device sends a request for the video program to the server system through the network. Upon receiving the request, the server system sends audio and video streams of the video program to the video slate device. Upon receiving the streams, the processor in the video slate device processes the streams and displays the video program on the external display (in case of a smart phone type video slate device 10, on the display 200). At the same time, audio is reproduced.

Figure 8:
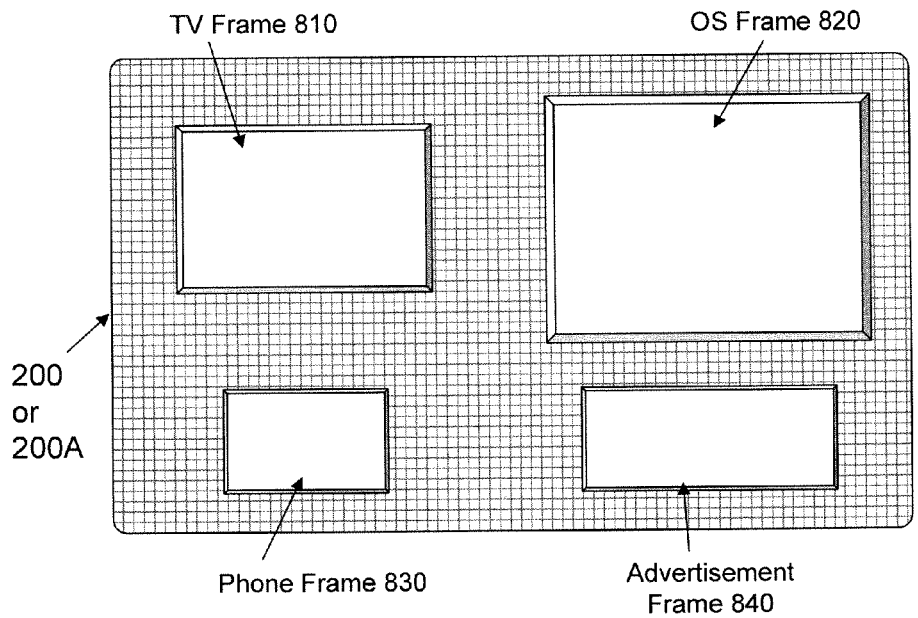
FIG. 8 shows an exemplary screen image of a vide slate device.

The video slate program stored in the video slate device 10 or 20, when executed, causes the video slate device 10 or 20 to provide a signal so that the display displays one or more content frames. As shown in FIG. 8, the content frames displayed on the display 200 may include an OS frame 820, a television frame 810, a phone frame 830 and an advertisement frame 840. The sizes of these frames may be changed by the user or adjusted by the video slate device automatically. When the user selects one of the frames, the selected frame may be displayed on the whole screen (i.e., "maximized") of the display.

The OS frame 820 shows an image of results of operations of the application program executed on the server as set forth above. Since the video slate device does not include a typical operating system and the server executes the application program, the OS frame 820 displays the operation results of the application program, regardless of operating systems on which the application program runs.

The phone frame 830 shows an image of remotely executing phone operation, for example, by a phone gateway in the server system. Through this phone frame 830, the user may make or receive a phone call. It is noted that the video slate 10 may not be a cellular phone itself. Text messages or SNS can be sent and received through the phone frame 830.

The television frame 810 shows video such as a television program or movie (or other images). When the video slate device receives a TV program through the network, the video slate device displays the TV program through the television frame 810. The video slate device does not need a tuner because the server system selects and sends the program for reproduction on the video slate device.

The advertisement frame 840 shows an image containing an advertisement, which is sent from an advertisement gateway in the server system.

An overall video slate system includes two or more video slate devices, for example, a first video slate device 10 and a second video slate device 20. The two devices may be independent, for operations by two different users; or two devices may be used together. In the latter case, the user utilizes the first video slate device 10 as an input terminal (i.e., a controller) for the second video slate device 20. The user can input a command to the first video slate device 10. In response to the input by the user to the first video slate device 10, the second video slate device 20 receives and displays operation results generated by the application program running in the server system according to the user input. For example, the first video slate device 10 may change the displayed image on the display 200 to which the second video slate device 20 output signals.

The video slate device, the video slate system and the method disclosed herein provide numerous advantages over conventional mobile terminals (e.g., cellular phones) or set top boxes. For example, the disclosed video slate device is simpler and less expensive than the conventional mobile terminals. The disclosed video slate device is also light weight and consumes low power, and thus does not require a high capacity battery. Further, the video slate device does not need updating of the operating system or application programs, which is a complicated and time consuming event for the users.

As shown by the above discussion, at least some implementations for operation of the video slate device or the server system may involve programming, for example, for the processor of the video slate device and/or for the computer. Program aspects of the technology may be thought of as "products" or "articles of manufacture" typically in the form of executable code and/or associated data that is carried on or embodied in a type of computer readable recording medium. "Storage" or "recording" type media include any or all of the non-transitory memory of the supporting electronics of the terminal or server that executes the respective program, such as various semiconductor memories, tape drives, disk drives and the like, which may provide storage at any time for the software programming. All or portions of the software may at times be communicated through the Internet, the wireless network serving the terminals or various other telecommunication networks. Such communications, for example, may enable loading of the software from one computer or processor into another computer or processor, for example, from a host or management server into the download server or into the video slate device devices.

Although certain specific examples have been disclosed, it is noted that the present teachings may be embodied in other forms without departing from the spirit or essential characteristics thereof. The present examples described above are considered in all respects as illustrative and not restrictive. The patent scope is indicated by the appended claims, and all changes that come within the meaning and range of equivalency of the claims are therefore intended to be embraced therein.

What is claimed is:

1. A terminal device comprising:
an input device for receiving a user input;
a storage medium storing a video slate program;
a network interface for communication via a network; and
a reproducing circuit for reproducing, respectively using an audio output and a display, audio and video streams received through the network interface, wherein:
the terminal device is configured to operate a non-native application program through the network and display operations of the non-native application program on the display,
the terminal device lacks a hard disk drive, any operating system for executing the non-native application program and internet browser software,
the terminal device includes, in terms of an operating system, only a minimum operating system utilized for executing only the video slate program, and
the video slate program, when executed, causes the terminal device to provide a signal so that the display displays one or more content frames, the content frames showing an image received from the server as a result of operation of the non-native application program.

2. The terminal device of claim 1, wherein the terminal device lacks any version of Windows, Android, a MAC OS, IOS, Linux, a RIM OS, QNX, GENIVI or VxWorks on which the non-native application program is able to be executed.

3. The terminal device of claim 1, wherein the video slate program, when executed, causes the terminal device to provide the signal so that the display displays at least one of:
an OS frame that shows an image of operations of the application program, regardless of operating systems on which the application program runs;
a phone frame that shows an image of a remotely executing phone operation;
a television frame that shows video; and
an advertisement frame that shows an image containing an advertisement.

4. The terminal device of claim 3, wherein;
the terminal device includes the display and the audio output,
the reproducing circuit comprises a processor, and
the minimum operating system and the video slate program are configured for execution by the processor.

5. The terminal device of claim 4, wherein the display and the input device are integrated as a touch panel display.

6. The terminal device of claim 4, wherein the terminal device includes a non-volatile rewritable memory having a capacity at most 1 GB.

7. The terminal device of claim 4, wherein the minimum operating system is based on a reduced Linux operating system.

8. The terminal device of claim 3, wherein:
the reproducing circuit comprises a processor,
the minimum operating system and the video slate program are configured for execution by the processor,
the terminal device is included in a set top box, and
the terminal device is configured to output image signals for displaying on an external display.

9. A system comprising:
a server system storing application programs and operating systems on which the application programs run;
a terminal device connected through a network to the server system, wherein:
the server system is configured to:
receive information for selecting an operating system among the operating systems, from the terminal device via the network;
receive information for selecting an application program which runs on the selected operating system, from the terminal device via the network;
execute the selected application program on the selected operating system by the server; and
send an operation image of an operation of the selected application program via the network to the terminal device,
the terminal device is configured to:
send the information for selecting an operating system;
send the information for selecting a non-native application program from among the application programs stored in the server;
operate the selected non-native application program through the network by user inputs via an input device; and
display the operation image of the operation of the selected non-native application program on a display,
the selected non-native application program is executed exclusively on the server system without executing any of the selected non-native application program and the selected operating system on the terminal device,
the terminal device lacks a hard disk drive, any operating system for executing the non-native application program and Internet browser software,
the terminal device includes, in terms of an operating system, only a minimum operating system utilized for only executing a video slate program resident on the terminal device, and
the video slate program, when executed, causes the terminal device to provide a signal so that the display displays one or more content frames, the content frames showing the operation image received from the server.

10. The system of claim 9, wherein the terminal device lacks any version of Windows, Android, a MAC OS, IOS, Linux, a RIM OS, QNX, GENIVI or VxWorks.

11. The system of claim 9, wherein the video slate program, when executed, causes the terminal device to provide the signal so that the display displays at least one of:
an OS frame which shows an image of operations of the application program executed on the server, regardless of operating systems on which the application program runs;
a phone frame which shows an image of remotely executing phone operation;
a television frame which shows a television program view; and
an advertisement frame which shows an image containing an advertisement.

12. The system of claim 11, wherein:
the server system is further configured to:
receive a request for audio and video data from the terminal device; and
send audio and video streams of the requested audio and video data upon receiving the request,
the terminal device comprises a reproducing circuit for reproducing audio and video streams as outputs through a display and an audio output device, and
the terminal device is configured to:
send the request received from a user through the input device,
receive the audio and video streams through the network from the server system, and
display a video on the display and output an audio from the audio output device by reproducing the received audio and video stream by the reproducing circuit.

13. The system of claim 12, wherein the terminal device includes the display and the audio output device.

14. The system of claim 11, wherein the terminal device includes a non-volatile rewritable memory having a capacity at most 1 GB.

15. The system of claim 12, wherein:
the server system is configured to detect a specification of the display including a size of the display, and
the server system is configured to adjust said one or more content frames to be displayed on the display.

16. The system of claim 11, wherein the minimum operating system is based on a reduced Linux operating system.

17. The system of claim 11, wherein:
the terminal device includes a first terminal device and a second terminal device,
in response to the input by the user to the first terminal, the second terminal displays operation results according to the input.

18. A method, comprising steps of:
receiving, by a server, Information for selecting an operating system among available operating systems, from a terminal device via a network;
receiving, by the server, Information for selecting an application program which runs on the selected operating system, from the terminal device via the network;
executing the selected application program exclusively on the selected operating system by the server without executing any of the selected application program and the selected operating system on the terminal device; and
sending, by the server, a display image of the executed application program via the network, to the terminal device, wherein:
the terminal device lacks a hard disk drive, any operating system for executing the application program and internet browser software, and
the terminal device includes, in terms of an operating system, only a minimum operating system utilized for only executing a video slate program resident on the terminal device.

19. The method of claim 18, further comprising a step of sending, by the server, video data in a stream to the terminal device upon receiving a request for the video data from the terminal device.

20. A method, comprising steps of:
sending, from a terminal device to a server via a network, Information for selecting an operating system among available operating systems executable on the server;

sending, from the terminal device to the server via the network, information for selecting an application program which runs on the server with the selected operating system;

receiving, by the terminal device, a display image of operation of the application program via the network, the application program being exclusively executed on the selected operating system by the server without executing any of the selected application program and the selected operating system on the terminal device; and executing a video slate program resident on the terminal device to cause the terminal device to provide a signal so that the display displays one or more content frames, the content frames showing an operation image received from the server, wherein:

the terminal device lacks a hard disk drive, any operating system for executing the application program and internet browser software, and the terminal device includes, in terms of an operating system, only a minimum operating system utilized for only executing a video slate program resident on the terminal device.

21. The method of claim 20, wherein the terminal device lacks any version of Windows, Android, a MAC OS, IOS, Linux, a RIM OS, QNX, GENIVI or VxWorks.

22. The method of claim 20, wherein the video slate program, when executed, causes the terminal device to provide the signal so that the display displays at least one of:

an OS frame which shows an image of operations of the application program executed on the server, regardless of operating systems on which the application program runs;

a phone frame which shows an image of remotely executing phone operation;

a television frame which shows a television program view; and an advertisement frame which shows an image containing an advertisement.

* * * * *